July 3, 1945. A. M. DRAKE 2,379,693
INTERNAL SCREW THREAD LAPPING MACHINE
Filed April 19, 1943 3 Sheets-Sheet 1

INVENTOR
Alden M. Drake
By Joseph M. Schofield
ATTORNEY

July 3, 1945.  A. M. DRAKE  2,379,693
INTERNAL SCREW THREAD LAPPING MACHINE
Filed April 19, 1943  3 Sheets-Sheet 2
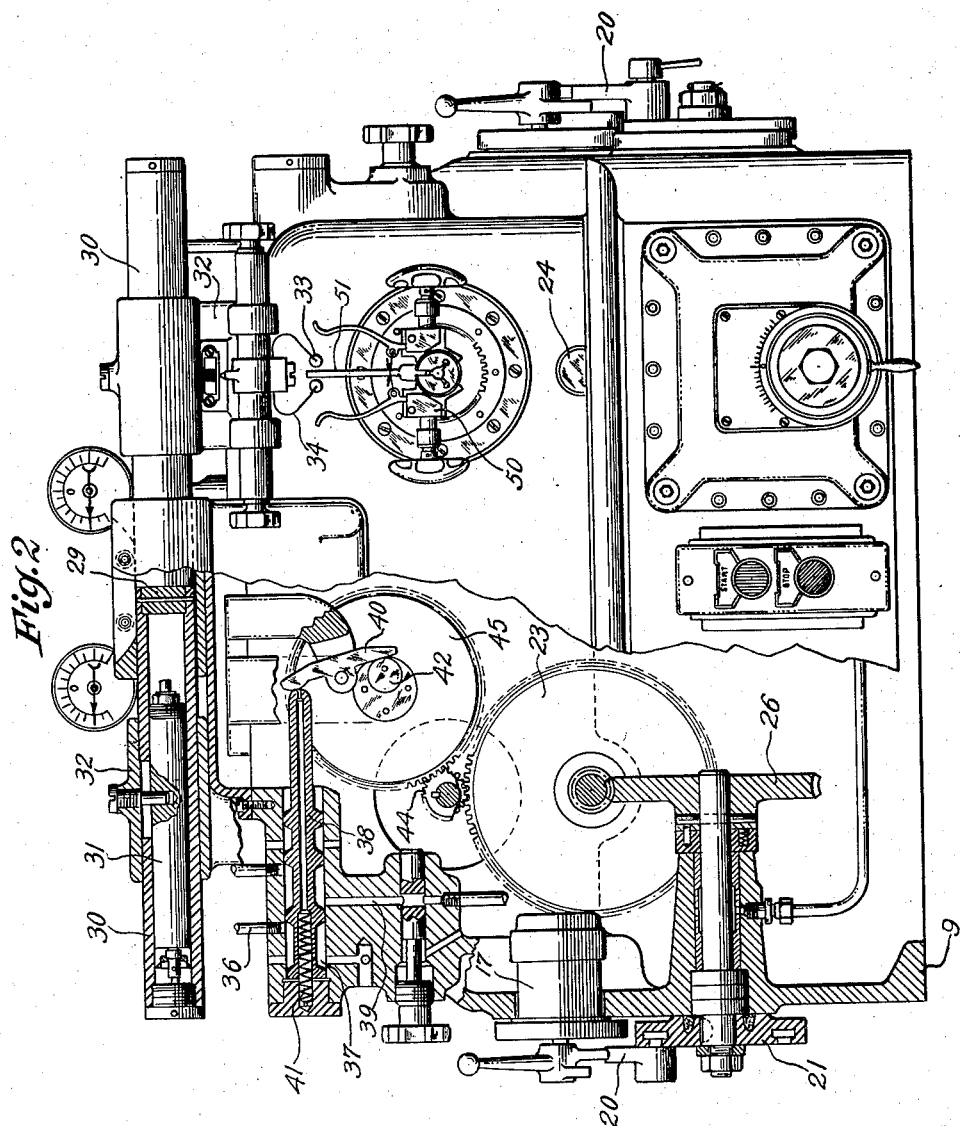
INVENTOR
Alden M. Drake
BY Joseph K Schofield
ATTORNEY July 3, 1945.   A. M. DRAKE   2,379,693
INTERNAL SCREW THREAD LAPPING MACHINE
Filed April 19, 1943   3 Sheets-Sheet 3

INVENTOR
Alden M. Drake
BY Joseph M. Schofield
ATTORNEY

Patented July 3, 1945

2,379,693

UNITED STATES PATENT OFFICE 2,379,693

INTERNAL SCREW THREAD LAPPING MACHINE

Alden M. Drake, West Hartford, Conn., assignor to Niles-Bement-Pond Company, West Hartford, Conn., a corporation of New Jersey Application April 19, 1943, Serial No. 483,563

6 Claims. (Cl. 51—96)

This invention relates to lapping machines for lapping thread gages or for lapping other members having internal screw threads.

More particularly the invention relates to hydraulic mechanism for rotating a threaded lapping tool predetermined numbers of revolutions in each direction while engaged by a work piece being lapped, there being means to simultaneously oscillate the work piece about the axis of its screw threads during rotation of the lapping tool in each direction.

A primary object of the invention is to provide a machine having means to rotate a lapping tool in the form of a threaded member predetermined numbers of revolutions in each direction about its axis and to simultaneously reciprocate a member through any predetermined distance in a direction normal to the axis of the lapping tool, there being interconnecting means between the work piece and the reciprocating member so that the work being lapped may be oscillated through portions of a revolution by movement of the reciprocating member.

Another object of the invention is to provide resilient inter-connecting means between the work piece being lapped and the reciprocating member so that the reciprocating member or slide can accomplish its full stroke regardless of the extent of oscillatory movement of the work piece.

Another object of the invention is to provide hydraulic mechanisms for controlling the speed of rotation and the reversals of rotation of the spindle on which is mounted the lapping tool and to control the speed of the reciprocating member by means of which the work piece is oscillated.

And finally it is an object of the invention to provide a holder permitting size adjustment of the screw threads being lapped during the lapping operation.

With the above and other objects in view the invention consists in the features of construction and operation set forth in the following specification and illustrated in the accompanying drawings.

In the drawings annexed hereto and forming a part of this invention:

Fig. 2 is a front elevation, partly in section, showing the parts of a duplex machine similar to that shown in Fig. 1.

Figures 1, 6:
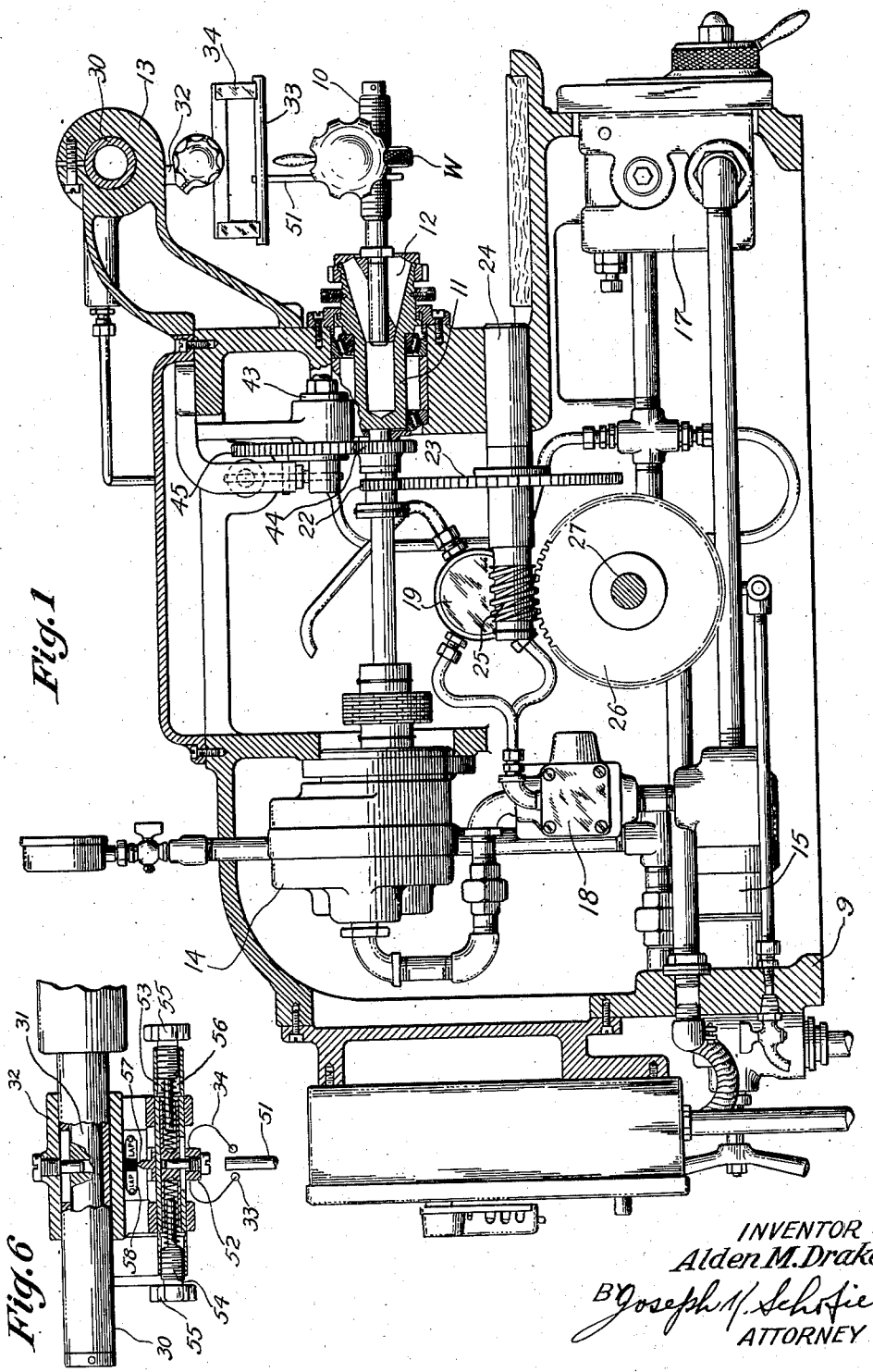
Figure 1 is a side elevation in section showing a complete machine forming an embodiment of the present invention.
Fig. 6 is a detail view of the slide and the resilient connections between the slide and the actuator for oscillating the gage and gage holder, parts being shown in section to more clearly disclose their construction.

Briefly and in its broadest aspect the invention may comprise the following principal parts: First, a base having a motor driven hydraulic pump adapted to pump a fluid at high pressure into a hydraulic system from a tank or sump preferably forming part of the base; second, a work supporting and rotating spindle within said base driven in opposite directions of rotation by fluid means; third, a reciprocating member actuated by fluid means in a direction normal to the axis of the spindle on which the lapping tool is mounted; fourth, reversing mechanism for the spindle rotating means operative to successively reverse the rotation of the spindle after predetermined numbers of turns; and fifth, a holder for the gage being lapped having a member outstanding therefrom engaged by resilient members depending from the reciprocating member to oscillate the gage being lapped during rotation of the lapping tool and its spindle.

Referring more in detail to the figures of the drawings, there has been shown a duplex or two spindle machine, each spindle of which and its associated mechanism constitutes a complete lapping unit or machine. As will be seen in Figs. 1 and 2, the lapping tool 10 is mounted detachably but fixedly upon one end of a horizontal spindle 11, there being a collet 12 or other form of chuck for that purpose enabling lapping tools 10 to be substituted one for the other or adjustments made of the lap to different rotative positions. This spindle 11 is rotatably mounted within the base 9 of the machine and may be rotated by any means, such as by the hydraulic motor 14 directly connected in alinement therewith.

Figure 5:
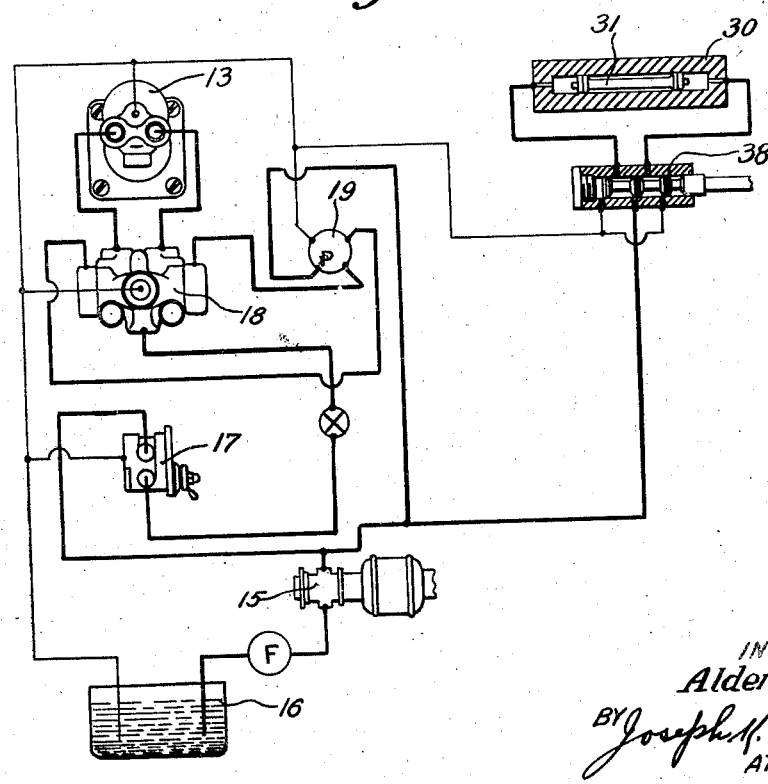
Fig. 5 is an outline diagram of the hydraulic mechanism for actuating the spindle rotation and reciprocating member.

The motor 13 as shown is of the fluid type and is operated by means of a hydraulic circuit shown in outline in Fig. 5. A motor driven pump 15 has its intake connected to a return tank 16 filled with water, oil or other fluid and delivers the fluid under a suitable pressure to a control valve 17. From this valve 17 the fluid enters the intake of a distributing or reversing valve 18 from which the fluid enters one side or the other of the motor 13 depending upon the position of the distributing valve 18. To actuate the distributing valve 18 a control valve 19 is moved alternately to its opposite positions by adjustable dogs 20 on a cam disc 21 presently to be more fully described. The motor 13 is rotated predetermined numbers of revolutions in one direction and reversed and then rotates an equal number of revolutions in the opposite direction. This rotation is maintained long enough to completely lap a threaded member.

It will be understood that in the machine shown in Figs. 1 and 2 in which two spindles 11 are provided there will be independently operating motors 13, one for each spindle, and, correspondingly, there will be duplicate sets of valves 17, 18 and 19 and cam discs 21.

In order to rotate this spindle 11 predetermined number of revolutions alternately in each direction, means are provided to drive the cam disc 21 having adjustable dogs 20 mounted thereon from the spindle 11. For this purpose a small gear 22 is mounted directly on the spindle in mesh with a large gear 23 on an intermediate shaft 24, there also being a worm 25 on this intermediate shaft. In mesh with this worm 25 is a worm wheel 26 on a shaft 27 having at its outer end cam disc 21 with cams 20 adjustable angularly about its periphery. These cams 20 upon rotation of the cam disc 21 with the spindle 11 oscillate the control valve 19 to change the position of the distributing valve 18 and the direction of fluid through the spindle rotating motor 13 so that each time the control valve 19 is shifted by one of the dogs 20 the rotation of the spindle 11 will be reversed.

Mounted upon the forward and upper portion of the base 9 is a cylinder 30 within which operates a piston 31, the piston being connected to a slide 32, preferably and as shown in Figs. 1 and 2 which surrounds the cylinder 30. The cylinders 30 for the two parts of the machine may be in alinement and retained in position on the base by being clamped at their central portion as shown in Fig. 2. A centrally mounted plug 29 divides the elongated member into two independent cylinders 30. Reciprocation, therefore, of a piston 31 within its cylinder 30 oscillates its slide 32. Depending from this slide 32 are two bars 33 spaced a short distance apart and depending from the lower portion of the slide to which they are flexibly attached by means of suitable light springs 34 so that the bars 33 can move relative to the slide 32 against the pressure of these springs 34.

To reciprocate the slide 32 fluid under pressure is admitted to the opposite ends of the cylinder 30 through conduits, one of which is shown at 36 leading from separated portions of a valve chamber 37. The valve 38 within this chamber is moved to its operative positions to connect a fluid supply conduit 39 with either of the connections to the cylinder 30 by means of a rocker 40 acting to move the valve 38 in one direction and a spring 41 to move the valve in the opposite direction. To actuate the rocker 40 an eccentric 42 on a shaft 43 is rotated from the spindle 11 through gears 44 and 45. Preferably and as indicated in the diagram the fluid supply conduit to the cylinder 30 may be connected to the pump 15 for rotating the spindle 11 associated with the slide 32.

Figure 4:
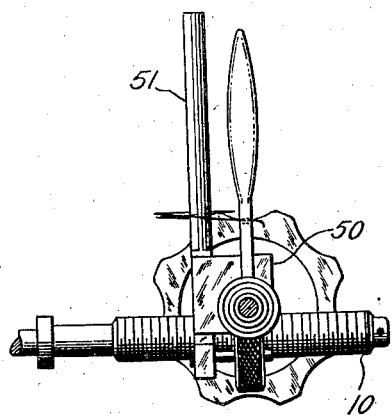
Fig. 4 is a side view of the parts shown in Fig. 3.
Figure 3:
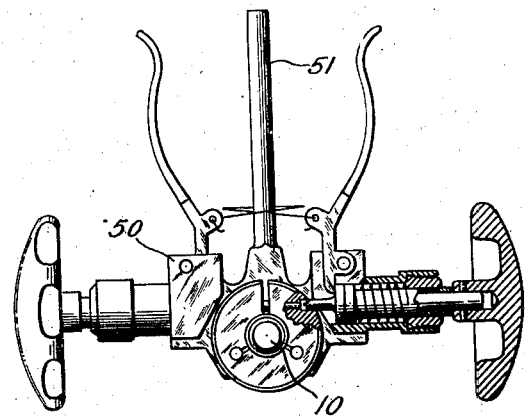
Fig. 3 is a front elevation of a work piece and its holder as shown in the position assumed when mounted on the lapping tool, the reciprocating member for oscillating the member being lapped being also shown.

To hold the work piece while engaging the lap 10 on the work spindle 11 during the lapping operation it is supported within an adjustable chuck or holder 50 shown most clearly in Figs. 3 and 4. This chuck 50 has means for enclosing the member W to be lapped and preferably has means for manually making adjustments to vary the size of the threads being lapped during progress of the lapping operation. As this holder forms the subject matter of my copending application Serial No. 448,276, filed June 24, 1942, now Patent No. 2,362,543, it is not thought that further description will be necessary. Outstanding from the holder 50 is an arm 51 preferably formed integrally with the holder and adapted to extend between the two resiliently supported bars 33 depending from the reciprocatory member 32. Reciprocation, therefore, of the member 32 and the bars 33 depending therefrom will cause oscillatory movements of the holder 50 and the gage W mounted therein. Should the work piece W tightly engage the lapping member 10, movement of the slide 32 may still take place by flexing of the springs 34, and as the springs engage opposite sides of the arm 51, the arm and holder 50, with the gage W, will be oscillated back and forth through angles depending upon the length of travel of the slide 32.

Carried by the slide member 32 is a supplementary slide 52 housed within a portion of the slide 32 and held centrally therein by means of opposed springs 53. To adjust the pressure of these springs 53, threaded members 54 having hand wheels 55 on their outer ends are provided. As shown in Fig. 6, the resilient members 34 for supporting the bars 33 are attached at their upper ends directly to the supplementary slide 52.

For convenience the supplementary slide 52 has hollow cylindrical portions slidable within a cylinder 56 secured in fixed position within a depending portion of the slide 32. To indicate the amount of sliding movement of the supplementary slide 52, which indicates the amount of lapping being done, an indicator or pointer 57 may be provided on the supplementary slide 52 movable adjacent a short scale 58.

In operation and with the dogs 20 on the cam disc 21 adjusted and the control for the slide 32 adjusted to limit the speed of the slide 32, the lapping tool 10 will be rotated upon its axis through any predetermined number of revolutions and simultaneously the piston 31 and its slide 32 will be reciprocated. This reciprocatory movement of the slide 32 will take place during rotation of the lapping tool 10 so that the work piece W will be oscillated simultaneously with rotation of the lapping tool. The stroke of the slide 32 may be made such that the maximum practical length of oscillatory movement of the gage holder 50 is effected. This oscillatory movement, however, must be variable during the progress of the lapping operation and for different types of work pieces. For that reason the resilient mounting for the supplementary slide 52 is provided and the spring mounting for the bars 33.

It will be understood that an abrasive compound will be supplied to the surface of the lapping tool 10 and periodically the holder 50 for the gage W being lapped will be adjusted to close the threaded surface of the work piece W upon the lapping tool 10 so that lapping can take place continuously and progressively lap the screw threads on the work piece.

What I claim is:

1. A machine for lapping threaded members comprising in combination, a base, a spindle mounted for rotation therein, a lapping tool mounted on said spindle, rotating means for said spindle, means to reverse the spindle rotation, a reciprocating member mounted on said base for movement in a direction at right angles to the axis of rotation of said spindle, a resilient member on said reciprocating member, a holder for a work piece while positioned on said spindle, said holder having an arm outstanding therefrom adapted to engage said resilient member, whereby engagement of said resilient member with said arm will oscillate said work piece relative to said tool during rotation of said spindle.

2. A machine for lapping threaded members comprising in combination, a base, a spindle mounted for rotation therein, a lapping tool mounted on said spindle, rotating means for said spindle, means to reverse the spindle rotation after predetermined numbers of rotations in each direction, a reciprocating member mounted on said base for movement in a direction at right angles to the axis of rotation of said spindle, a resilient member on said reciprocating member, a holder for a work piece while positioned on said spindle, said holder having an arm outstanding therefrom adapted to engage said resilient member, whereby engagement of said resilient member with said arm will oscillate said work piece relative to said tool during rotation of said spindle.

3. A machine for lapping threaded members comprising in combination, a base, a spindle mounted for rotation therein, a lapping tool mounted on said spindle, rotating means for said spindle, means to reverse the spindle rotation, a reciprocating member mounted on said base for movement in a direction at right angles to the axis of rotation of said spindle, means to vary the length of travel of said reciprocating member, a resilient member on said reciprocating member, a holder for a work piece while positioned on said spindle, said holder having an arm outstanding therefrom adapted to engage said resilient member, whereby engagement of said resilient member with said arm will oscillate said work piece relative to said tool during rotation of said spindle.

4. A machine for lapping threaded members comprising in combination, a base, a spindle mounted for rotation therein, a lapping tool mounted on said spindle, hydraulic means to rotate said spindle, means to reverse the spindle rotation, a reciprocating member mounted on said base for movement at right angles to the axis of rotation of said spindle, a resilient member on said reciprocating member, hydraulic means to reciprocate said member simultaneously with rotation of said spindle, a holder for a work piece while positioned on said spindle, said holder having an arm outstanding therefrom adapted to engage said resilient member, whereby engagement of said resilient member with said arm will oscillate said work piece relative to said tool during rotation of said spindle.

5. A machine for lapping threaded members comprising in combination, a base, a spindle mounted for rotation therein, a lapping tool mounted on said spindle, rotating means for said spindle, means to reverse the spindle rotation after predetermined numbers of rotations, a reciprocating member mounted on said base for movement in a direction at right angles to the axis of rotation of said spindle, a resilient member on said reciprocating member, means to vary the speed and length of movement of said member, a holder for a work piece while positioned on said spindle, said holder having an arm outstanding therefrom adapted to engage said resilient member, whereby engagement of said resilient member with said arm will oscillate said work piece relative to said tool during rotation of said spindle.

6. A machine for lapping threaded members comprising in combination, a base, a spindle mounted for rotation therein, a lapping tool mounted on said spindle, rotating means for said spindle, means to reverse the spindle rotation, a reciprocating member mounted on said base for movement in a direction at right angles to the axis of rotation of said spindle, resiliently supported parallel bars depending from said reciprocating member, a holder for a work place while positioned on said spindle, said holder having an arm outstanding therefrom and operating between said resilient bars, whereby engagement of said reciprocating member with said arm will oscillate said work piece relative to said tool during rotation of said spindle.

ALDEN M. DRAKE.